US010097772B2

(12) United States Patent
Miki et al.

(10) Patent No.: US 10,097,772 B2
(45) Date of Patent: Oct. 9, 2018

(54) IMAGE PROCESSING DEVICE AND IMAGE PROCESSING METHOD

(71) Applicant: Mitsubishi Electric Corporation, Tokyo (JP)

(72) Inventors: Yohei Miki, Tokyo (JP); Ichiro Furuki, Tokyo (JP); Toshiharu Aiura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/502,879

(22) PCT Filed: Oct. 31, 2014

(86) PCT No.: PCT/JP2014/079130
§ 371 (c)(1),
(2) Date: Feb. 9, 2017

(87) PCT Pub. No.: WO2016/067470
PCT Pub. Date: May 6, 2016

(65) Prior Publication Data
US 2017/0237909 A1    Aug. 17, 2017

(51) Int. Cl.
```
H04N 9/04      (2006.01)
H04N 5/225     (2006.01)
H04N 5/262     (2006.01)
H04N 5/265     (2006.01)
G06T 7/70      (2017.01)
G06T 7/33      (2017.01)
```
(52) U.S. Cl.
CPC ............ *H04N 5/2628* (2013.01); *G06T 7/33* (2017.01); *G06T 7/70* (2017.01); *H04N 5/265* (2013.01); *G06T 2207/30244* (2013.01)

(58) Field of Classification Search
CPC ..... H04N 5/2627; H04N 5/2628; H04N 5/265
USPC .................................................. 348/207.99
See application file for complete search history.

(56) References Cited

U.S. PATENT DOCUMENTS 8,077,203 B2    12/2011  Abe
2008/0198226 A1*  8/2008  Imamura ............ G06K 9/00805
                                                        348/148

(Continued)

FOREIGN PATENT DOCUMENTS

JP    2002-112421 A    4/2002
JP    2008-177856 A    7/2008

(Continued)

*Primary Examiner* — Anthony J Daniels
(74) *Attorney, Agent, or Firm* — Birch, Stewart, Kolasch & Birch, LLP

(57) ABSTRACT

A subject detecting unit 107 calculates a subject position on the basis of a subject region obtained by calculating the difference between an overhead image generated from an image for difference calculation stored in an image for difference calculation storage unit 106 and an overhead image generated by an overhead image generating unit 105. A projection plane calculating unit 108 forms a projection plane at the subject position, and a subject image generating unit 109 projects camera images of image taking devices 1a to 1c onto the projection plane, and generates a subject image. A display image generating unit 110 outputs to a display 2 an image formed by synthesizing the subject image with the overhead images generated by the overhead image generating unit 105.

3 Claims, 7 Drawing Sheets

(56) References Cited

U.S. PATENT DOCUMENTS

2014/0063197 A1\* 3/2014 Yamamoto ............. G08G 1/166
                                                348/46
2014/0139640 A1   5/2014 Shimizu
2014/0152827 A1\* 6/2014 Yamamoto ......... G06K 9/00791
                                                348/148

FOREIGN PATENT DOCUMENTS

| JP | 4907883 B2 | 4/2012 | | |
|----|----|----|----|----|
| JP | 5053043 B2 | 10/2012 | | |
| WO | WO-2012096058 A1 \* | 7/2012 | ............... | B60R 1/00 |
| WO | WO 2013/018173 A1 | 2/2013 | | |

\* cited by examiner

IMAGE PROCESSING DEVICE AND IMAGE PROCESSING METHOD

TECHNICAL FIELD

The present invention relates to an image processing device and an image processing method for generating an overhead image from a camera image taken with an image taking device.

BACKGROUND ART

A technique has been known which generates an overhead image being a view looked down from a virtual viewpoint above by projecting a camera image onto the ground. In the overhead image generated in this way, an object positioned at the height of the ground is normally displayed. On the other hand, an object having three-dimensional shape is displayed in a greatly distorted form in which the object is extended as if it falls down onto the ground.

Regarding this problem, for example, in Patent Document 1, the following technique is disclosed: in a camera image taken with a camera that shoots a direction in which an obstacle is detected, the width of the image positioned in a region farther than the obstacle viewed from a vehicle is compressed toward the center of a vehicle surrounding image (overhead image), thereby generating the vehicle surrounding image. This technique prevents the three-dimensional obstacle from being displayed distortedly in the overhead image. In this technique, the obstacle is detected with a sensor like an ultrasonic sensor.

CITATION LIST

Patent Literature

Patent Document 1: Japanese Patent No. 5053043.

SUMMARY OF INVENTION

Technical Problem

According to the Patent Document 1, the whole of the region farther than the obstacle is a target of the compression processing. In other words, regardless of whether or not another obstacle is detected still farther than the first obstacle in the region, the whole of the region is compressed. Thus, in the Patent Document 1, another obstacle still farther than an obstacle is not taken into consideration, and the suppression of the distortion is not applied to the plurality of obstacles individually. As a result, the whole portion far from an obstacle in which no obstacle exists, that is, the entire portion that is unnecessary to be compressed is subjected to the compression processing. When the portion unnecessary to be compressed is compressed, distortion occurs in the portion.

The present invention is implemented to solve the above problems, and it is an object of the present invention to provide an image processing device and an image processing method capable of suppressing the distortion for each of the objects individually.

Solution to Problem

An image processing device according to the present invention includes: an image acquiring unit acquiring an image taken with at least one image taking device; an overhead image generating unit calculating, on a basis of image taking device information regarding the at least one image taking device and space information regarding a space whose image is taken with the at least one image taking device, correspondence between pixel data constituting the image and the space, and generating overhead image from the image based on the correspondence; an object detecting unit detecting a position of an object on which corresponding information does not exist in the space information; a projection plane calculating unit calculating a projection plane at the position of the object; an object image generating unit generating an object image of the object looked at from a viewpoint position of the overhead image by setting the image onto the projection plane; a display image generating unit generating an image by synthesizing the object image with the overhead image; and an overhead image for difference calculation generator generating overhead images for difference calculation from an images for difference calculation by calculating correspondence between pixel data constituting the images for difference calculation taken with a plurality of image taking devices included in the at least one image taking device and taking a plurality of images respectively and the space on the basis of the image taking device information and the space information. The overhead image generator generates the overhead images from the images taken with the plurality of the image taking devices, respectively. The overhead image for difference calculation generator generates the overhead images for difference calculation from the images for difference calculation taken with the plurality of image taking devices. The object detector obtains an object region from a difference between the overhead image and the overhead image for difference calculation for each of the at least one image taking device, and detects a superimposed portion of the object regions as the position of the object.

Advantageous Effects of Invention

According to the present invention, it is possible to generate object images whose respective distortions are individually suppressed in an overhead image.

DESCRIPTION OF EMBODIMENTS

In the following, some embodiments for carrying out the invention will be described with reference to the accompanying drawings to explain the present invention in more detail.

Embodiment 1

Figure 1:
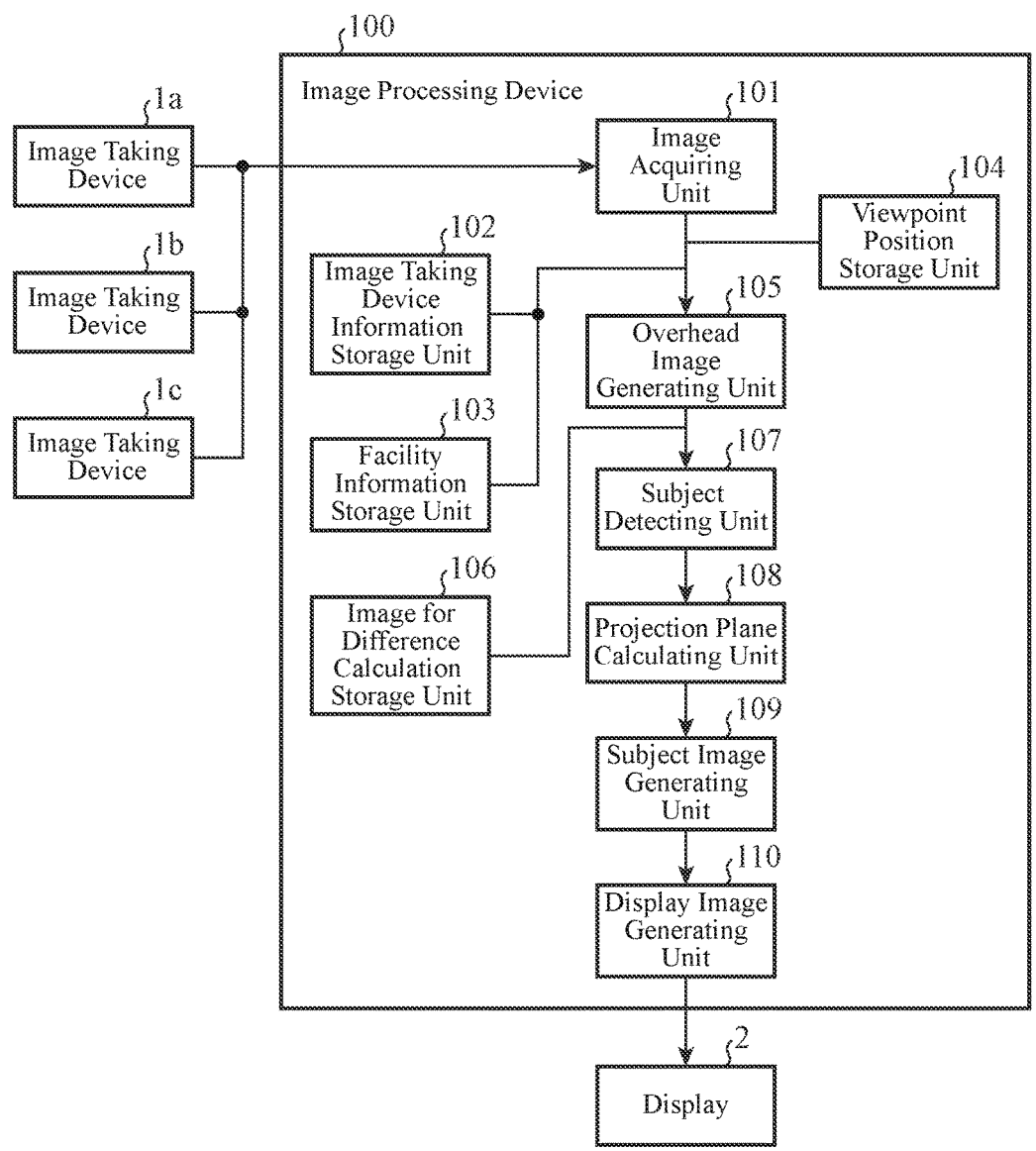
FIG. 1 is a block diagram showing a configuration of an image processing device according to an embodiment 1 of the present invention.

FIG. 1 shows a configuration of an image processing device 100 according to an embodiment 1 of the present invention. FIG. 1 also shows image taking devices 1a to 1c and a display 2.

The image processing device 100 includes an image acquiring unit 101, an image taking device information storage unit 102, a facility information storage unit 103, a viewpoint position storage unit 104, an overhead image generating unit 105, an image for difference calculation storage unit 106, a subject detecting unit 107, a projection plane calculating unit 108, a subject image generating unit 109, and a display image generating unit 110.

The image acquiring unit 101 acquires camera images (camera taken picture) from the image taking devices 1a to 1c which have taken the images, respectively.

The image taking device information storage unit 102 stores information regarding the image taking devices 1a to 1c as image taking device information. The image taking device information includes, for example, installation positions of the image taking devices 1a to 1c, their directions, focal lengths of their lenses and the like.

The facility information storage unit 103 stores information about spaces on which images are taken with the image taking devices 1a to 1c and which are targets to be monitored, as facility information (space information). The facility information includes, for example, the sizes of the spaces which are monitoring targets, positions and heights of walls, sizes and positions of structures always installed on the spaces, and the like.

The viewpoint position storage unit 104 stores a viewpoint position used for generating overhead images.

On the basis of the image taking device information and the facility information, the overhead image generating unit 105 generates overhead images from the camera images acquired by the image acquiring unit 101.

The image for difference calculation storage unit 106 stores the camera images taken with the image taking devices 1a to 1c in advance as images for difference calculation. The images for difference calculation may be acquired and updated at a regular interval.

The subject detecting unit 107 detects subject positions (positions of objects) on the basis of the overhead images generated by the overhead image generating unit 105 and the images for difference calculation. A subject in the present invention refers to an object other than objects stored in the facility information, and an object other than objects included in the images for difference calculation. Namely, the subject refers to an object about which the image processing device 100 is unable to know in advance that the object is present in the spaces monitored by the image taking devices 1a to 1c. For example, a person or the like temporarily passing through the spaces monitored by the image taking devices 1a to 1c is a subject.

The projection plane calculating unit 108 calculates a projection plane to be newly defined at the subject position detected by the subject detecting unit 107.

The subject image generating unit 109 generates a subject image (object image) by setting a camera image on the projection plane defined by the projection plane calculating unit 108

The display image generating unit 110 generates and outputs an image formed by synthesizing the overhead image generated by the overhead image generating unit 105 with the subject image generated by the subject image generating unit 109.

The image acquiring unit 101 includes an interface (for example, an USB port) for acquiring the camera images from the image taking devices 1a to 1c.

The image taking device information storage unit 102, facility information storage unit 103, viewpoint position storage unit 104, and image for difference calculation storage unit 106 can be formed by various types of storages such as a hard disk.

The overhead image generating unit 105, subject detecting unit 107, projection plane calculating unit 108, subject image generating unit 109, and display image generating unit 110 can be formed by, for example, a semiconductor integrated circuit on which a Central Processing Unit (CPU) is implemented.

The image taking device information storage unit 102, facility information storage unit 103, viewpoint position storage unit 104, and image for difference calculation storage unit 106 can be positioned outside the image processing device 100 as an external storage of the image processing device 100. In this case, the storage and the image processing device 100 are electrically connected.

In the case where the image processing device 100 is formed by a computer, the image taking device information storage unit 102, facility information storage unit 103, viewpoint position storage unit 104, and image for difference calculation storage unit 106 can be provided using the internal memory or external memory of the computer; and the image acquiring unit 101, overhead image generating unit 105, subject detecting unit 107, projection plane calculating unit 108, subject image generating unit 109, and display image generating unit 110 can be implemented by storing programs describing the processing of them in the memory of the computer so as to enable the CPU of the computer to execute the programs.

Each of the image taking devices 1a to 1c is formed by a camera. Note that, the number of the cameras is not limited to three as shown in FIG. 1.

The display 2 displays an image outputted by the display image generating unit 110. The display 2 is a liquid crystal display, for example.

Figure 2:
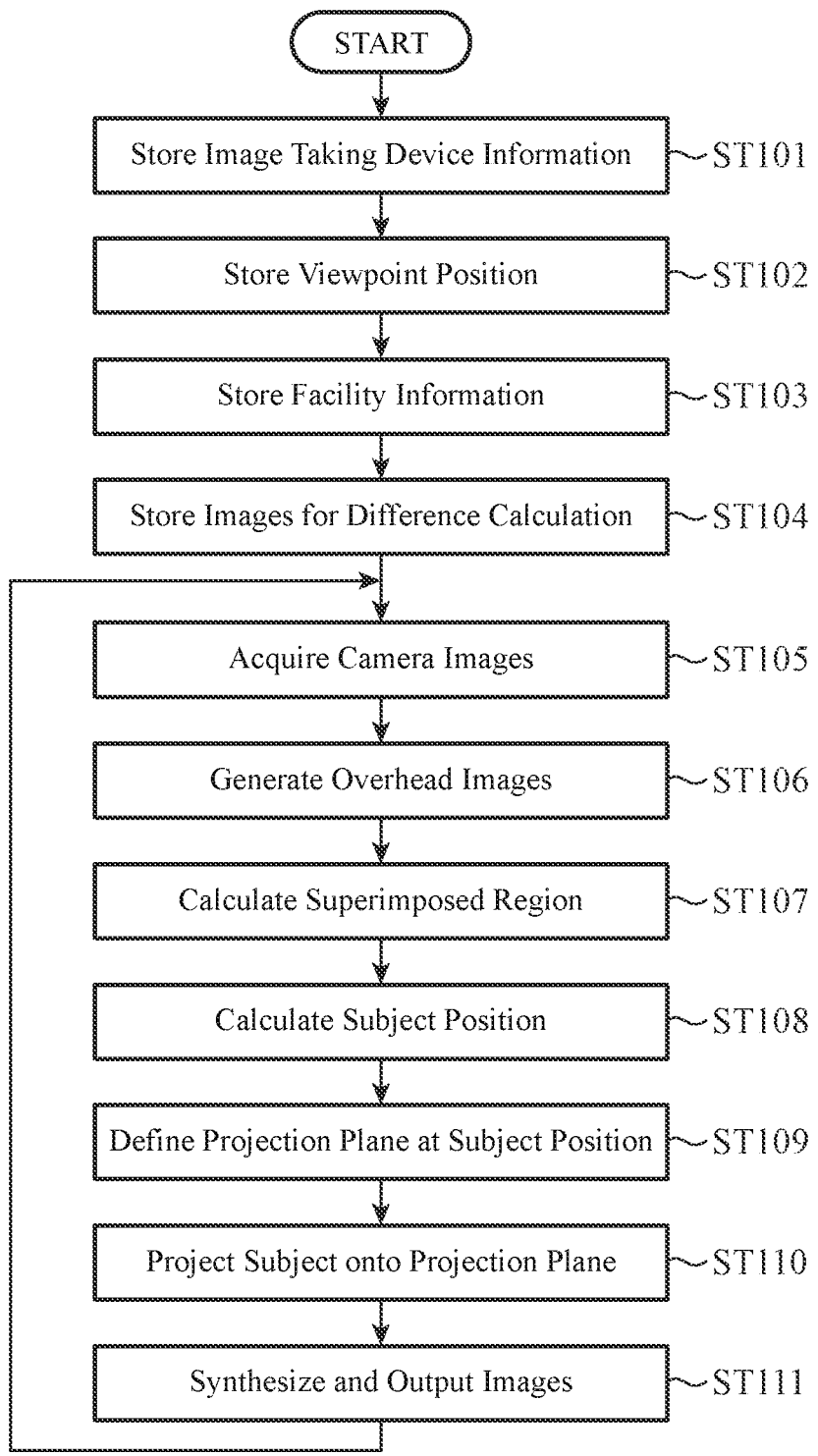
FIG. 2 is a flowchart showing the processing of the image processing device according to the embodiment 1 of the present invention.

Next, an example of the processing of the image processing device 100 will be described with reference to the flowchart of FIG. 2.

The image taking device information is stored in the image taking device information storage unit 102 (step ST101).

Subsequently, the viewpoint position is stored in the viewpoint position storage unit 104 (step ST102).

Subsequently, the facility information is stored in the facility information storage unit 103 (step ST103).

Subsequently, the images for difference calculation is stored in the image for difference calculation storage unit (step ST104).

The above steps ST101 to ST104 are processing carried out in advance by a user or the like before executing the processing of generating the overhead images from the camera images taken with the image taking devices 1a to 1c.

Subsequently, the image acquiring unit 101 acquires the camera images taken with the image taking devices 1a to 1c (step ST105). The camera images are composed of pixel data and the like.

Subsequently, on the basis of the image taking device information stored in the image taking device information storage unit 102 and the facility information stored in the facility information storage unit 103, the overhead image generating unit 105 generates the overhead images looked down from the viewpoint position stored in the viewpoint position storage unit 104 from the camera images acquired by the image acquiring unit 101 (step ST106).

Here, a generating method of the overhead images at step ST106 will be described in detail below.

First, on the basis of the facility information, the overhead image generating unit 105 transforms walls, structures always installed, and the like in the spaces into polygons. In this way, the walls, the structures always installed, and the like in the spaces are defined using the three-dimensional positions of the vertices of the generated individual polygons.

Subsequently, on the basis of the intersections between the straight lines, which connect the three-dimensional positions of the vertices of the individual polygons and the optical center of the image taking device 1a, and the imaging element plane of the image taking device 1a, the overhead image generating unit 105 obtains three-dimensional positions $D=(dist_x, dist_y, dist_z)^T$ of the pixel data corresponding to the vertices of the individual polygons. The three-dimensional position D is a vector. The superscript T denotes the transposition. In addition, the imaging element plane refers to a plane on which light-receiving elements constituting the imaging element are arranged two-dimensionally. Further, the three-dimensional position of the pixel data mean the three-dimensional position of the light-receiving element corresponding to the pixel data.

In this case, a point Q on the straight line that connect the three-dimensional position of a vertex $P=(P_x, P_y, P_z)^T$ of each polygon and the optical center $C=(C_x, C_y, C_z)^T$ of the image taking device 1a is given by the following Expression (1). In addition, a point Q' on the imaging element plane of the image taking device 1a is given by the following Expression (2).

Each of the vertex P, optical center C, point Q, and point Q' is a vector, and are denoted by bold letters in Expression (1) and Expression (2).

$$Q=(P-C)\times t+C \quad (1)$$

$$Q'=u\times a+v\times b+I \quad (2)$$

The sign u in Expression (2) denotes a unit vector in the x-axis direction on the imaging element plane, and v denotes a unit vector in the y-axis direction on the imaging element plane perpendicular to the x-axis direction. The sign I in Expression (2) denotes a vector representing the central coordinate of the imaging element plane. The unit vectors u and v, and the central coordinate I are denoted by bold letters in Expression (2). The unit vectors u and v, the central coordinate I and the optical center C in Expression (1) can be obtained from the image taking device information. Alternatively, they may be contained in the image taking device information in advance.

The three-dimensional position D is positioned on the straight line given by Expression (1) and on the plane given by Expression (2). Accordingly, assuming that Q=Q', Expression (1) and Expression (2) can be integrated to the following Expression (3).

$$C-I=[u\ v\ P-C](a\ b\ t)^T \quad (3)$$

Since each of the values a, b, t can be obtained from Expression (3), the three-dimensional position D can be calculated.

To convert the calculated three-dimensional position D into the pixel position (image_x, image_y) on the camera image, the following Expression (4) and Expression (5) are used.

$$image\_x=a*camera\_px\_width+camera\_px\_width/2 \quad (4)$$

$$image\_y=b*camera\_px\_height+camera\_px\_height/2 \quad (5)$$

The camera_px_width in Expression (4) denotes the number of light-receiving elements lined up in the x-axis direction on the imaging element plane (the number of pixels in the x-axis direction on the camera image). Likewise, the camera_px_height in Expression (5) denotes the number of light-receiving elements lined up in the y-axis direction on the imaging element plane (the number of pixels in the y-axis direction on the camera image).

On the basis of the correspondence between the vertices of the individual polygons and the pixel positions on the camera image obtained as described above, that is, the correspondence between the vertices of the individual polygons and the pixel data, it becomes possible to generate the overhead image looked down from the viewpoint position stored in the viewpoint position storage unit 104 by mapping the pixel data of the camera image onto the three-dimensional space. As for the case of each of the image taking devices 1b and 1c, the flow for generating the overhead image from the camera image is same to the case of the above described image taking device 1a.

Note that, although the foregoing description is made as to the case where the walls and structures always installed and the like within the spaces are defined as polygons on the basis of the facility information, faces of the walls and faces of the structures always installed and the like within the spaces can be defined as a point group. In this case also, using the foregoing method makes it possible to obtain the correspondence between the individual points and the pixel positions on the camera image.

In the above, detailed explanation of the processing at step ST106 is described.

Subsequently, the subject detecting unit 107 superimposes the three overhead images obtained on the basis of the camera images of the image taking devices 1a to 1c, which are generated by the overhead image generating unit 105, and obtains a region (referred to as a superimposed region from now on) in which two or more overhead images are superimposed (step ST107). The superimposed region can be obtained by using a variety of well-known image processing techniques.

Subsequently, the subject detecting unit 107 obtains the position at which the subject is present (subject position) in the superimposed region obtained at step ST107 (step ST108).

A method for obtaining the subject position will be described with reference to FIG. 3. Here, an example will be described in which the image taking devices 1a and 1b and the subject 3 are arranged to form a relationship as shown in FIG. 3(*a*). Although the actual subject is a person or the like, the subject 3 here is supposed to be cylindrical shape for simplifying the description.

Figure 3A:
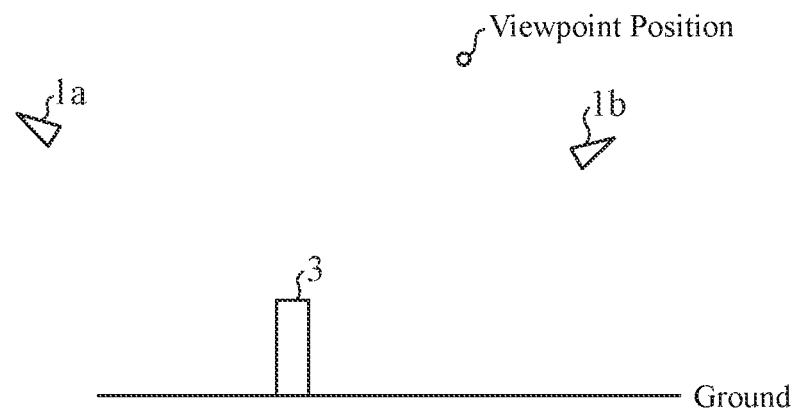
FIG. 3 is a diagram illustrating a calculation method of a subject position.

In the positional relationships shown in FIG. 3(a), the camera images taken with the image taking devices 1a and 1b are converted into the overhead images, respectively, by the processing at steps ST105 and ST106 described above. Then the superimposed region of the overhead images is obtained by the processing at step ST107 described above.

As the processing at step ST108 following step ST107, using the images for difference calculation taken with the image taking devices 1a and 1b selected from among the images for difference calculation stored in the image for difference calculation storage unit 106, the subject detecting unit 107 generates the overhead images (overhead images for difference calculation), respectively. The method for generating the overhead images from the images for difference calculation is the same as the processing at step ST106. The images for difference calculation are composed of the pixel data and the like similarly to the camera images. Note that, before proceeding to the processing at step ST108, the overhead image generating unit 105 may generate the overhead images using the images for difference calculation. Anyway, the subject detecting unit 107 or the overhead image generating unit 105, which generates the overhead images for difference calculation from the images for difference calculation, functions as an overhead image for difference calculation generating unit.

Figure 3B:
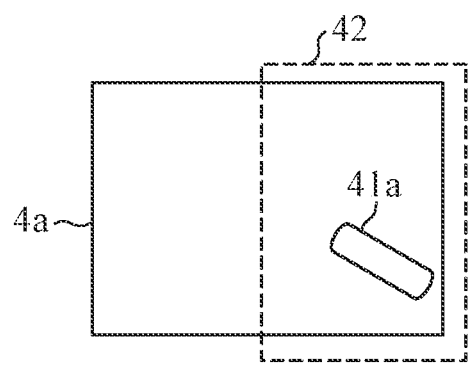
Figure 3C:
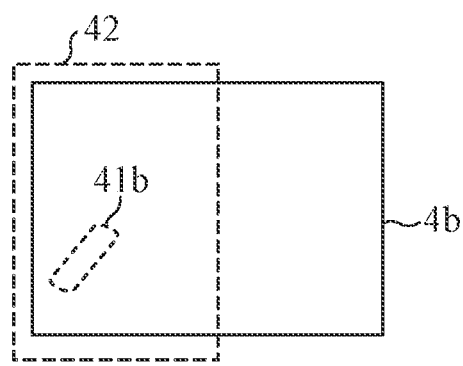

Subsequently, the subject detecting unit 107 calculates, for each of the image taking devices, the differences between the overhead images generated by using the images for difference calculation and the overhead images generated by the processing at step ST106, and thereby obtains a region in which the subject 3 is present within the overhead images (the region is referred to as a subject region from now on. The subject region may also be referred to as an object region). FIG. 3(b) shows a subject region 41a specified within the overhead image 4a corresponding to the image taking device 1a, and FIG. 3(c) shows a subject region 41b specified within the overhead image 4b corresponding to the image taking device 1b. FIG. 3(b) and FIG. 3(c) also show a superimposed region 42 of the overhead images 4a and 4b obtained by the processing at step ST107. As shown in FIG. 3(b) and FIG. 3(c), the subject regions 41a and 41b show the subject 3 that is extended as if it falls down onto the ground.

Figure 3D:
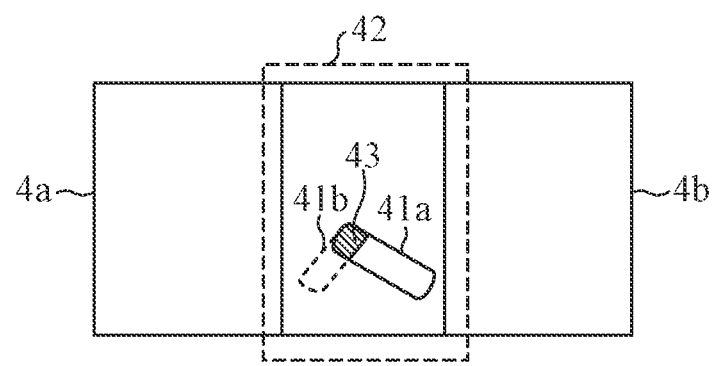

Subsequently, as shown in FIG. 3(d), the subject detecting unit 107 obtains a portion in which the subject region 41a and the subject region 41b are superimposed in the superimposed region 42, and specifies the portion as the subject position 43. The subject position 43 approximately corresponds to the contact surface between the subject 3 and the ground.

In the above, the detailed description of the processing at step ST108 is provided.

Figure 4A:
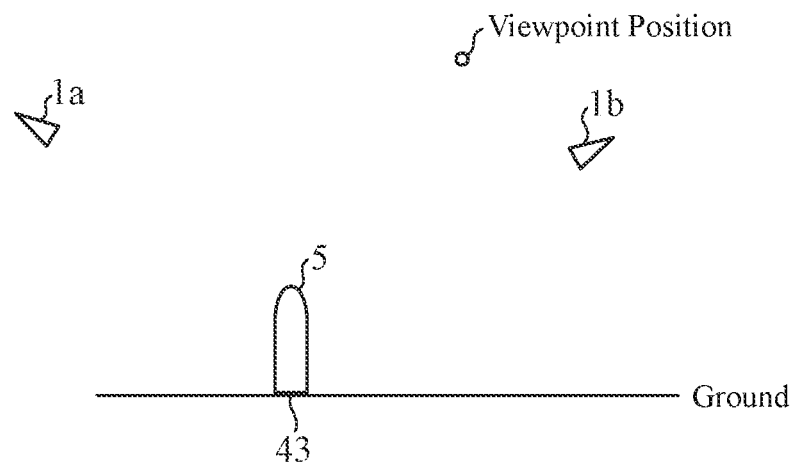
FIG. 4 is a diagram showing a newly defined projection plane.

Subsequently, the projection plane calculating unit 108 newly defines a virtual projection plane at the subject position obtained by the subject detecting unit 107 (step ST109). The projection plane is made viewable from the viewpoint position. As shown in FIG. 4(a), the projection plane is defined as a column-shaped projection plane 5 with such a size that covers the subject position 43, for example.

Subsequently, the subject image generating unit 109 projects the camera images onto the projection plane defined by the projection plane calculating unit 108 (step ST110). The projection plane defined by the projection plane calculating unit 108 can be defined as a polygon or a point group just as the walls, structures and the like within the spaces, which are contained in the facility information. Therefore, just as in the foregoing step ST106, the correspondence between the individual points constituting the projection plane and the pixel positions on the camera images, that is, the correspondence between the individual points and the pixel data can be calculated.

The subject image generating unit 109 obtains the correspondence between the individual points constituting the projection plane and the pixel data, and on the basis of the correspondence, carries out mapping of the pixel data corresponding to the individual points of the projection plane in such a manner as to project the camera images onto the projection plane. Additionally, in the overhead image, by applying masking processing to the pixel data other than the pixel data corresponding to the subject regions, they can be excluded from the mapping processing onto the projection plane. As a result, it is possible to prevent images other than the subject from being included on the projection plane.

A plurality of camera images are projected on the projection plane. For example, the camera images of the image taking devices 1a and 1b are projected on the projection plane 5 which is defined as shown in FIG. 4(a) with respect to the subject position 43 obtained in the superimposed region 42 as shown in FIG. 3.

The subject image generating unit 109 generates a subject image on the basis of the camera images projected on the projection plane. The subject image is generated by converting the camera images projected on the projection plane into the image looked at from the viewpoint position used for generating overhead images.

Subsequently, the display image generating unit 110 outputs to the display 2 the image obtained by synthesizing the subject image generated by the subject image generating unit 109 with the overhead images generated by the overhead image generating unit 105 at step ST106 (step ST111). In this processing, the display image generating unit 110 may synthesize the subject image with the overhead images obtained by removing the pixel data within the subject region from the overhead images generated by the overhead image generating unit 105. This makes it possible to reduce the disadvantage that the subject is doubly displayed.

Note that, when the actual shape of the subject is complicated, and unless the actual shape is represented on the projection plane, there are disadvantage that the portion of the subject where the projected camera images overlap may be displayed blurredly. A method to avoid such a situation will be described with reference to the example of FIG. 4(a). On the basis of the vectors connecting the optical centers of the image taking devices 1a and 1b with the individual points of the projection plane 5, and the vectors connecting the viewpoint position of the overhead images with the individual points of the projection plane 5, the subject image generating unit 109 may designed to project, among the camera images of the image taking devices 1a and 1b, only the camera image viewable from the viewpoint position of the overhead image on the projection plane 5. Alternatively, the projection plane calculating unit 108 may correct the shape of the projection plane 5 on the basis of the shape of the subject region or the like.

Figure 4B:
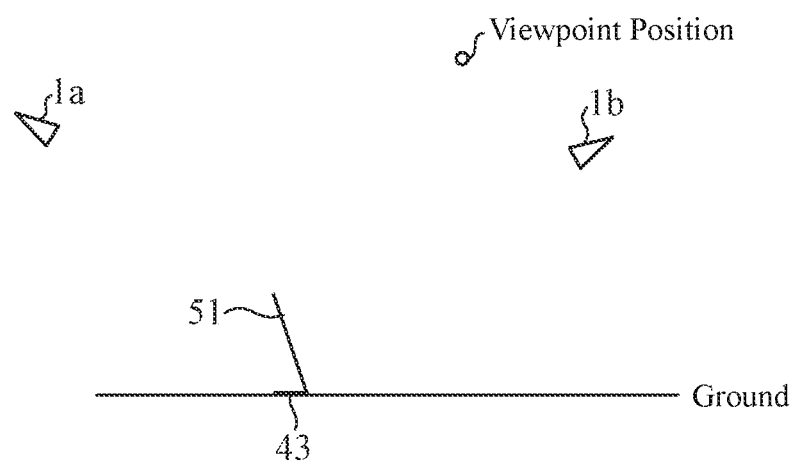

In addition, when projecting only one camera image on the projection plane, the projection plane calculating unit 108 may define a plane, which stands facing the image taking device that outputs the camera image, as the projection plane. FIG. 4(b) shows a flat projection plane 51 that is defined when projecting only the camera image of the image taking device 1b. The projection plane 51 is defined in such a manner as to cover the subject position 43 when it is projected on the ground, for example.

Figure 5A:
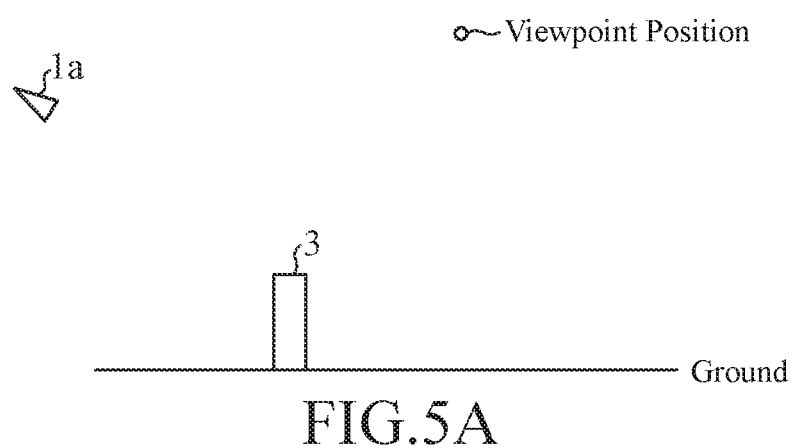
FIG. 5 is a diagram illustrating a calculation method of a subject position.

In addition, in the above case, the subject position is specified in the superimposed region. In the following, a method will be described in which the subject position is specified in a region other than the superimposed region, or only one image taking device 1a is installed so that there is no superimposed region originally. Here, an example will be described in which only one image taking device 1a is installed as shown in FIG. 5.

Figure 5B:
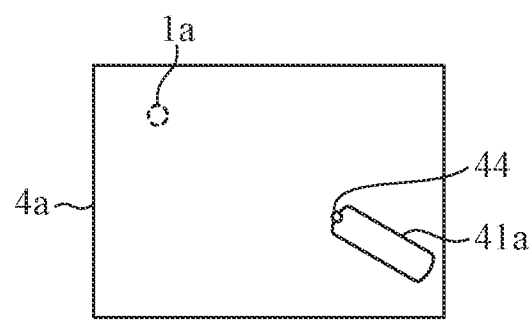

In the same manner as a part of the processing at step ST108, the subject detecting unit 107 calculates the difference between the overhead image generated on the basis of the image for difference calculation taken with the image taking device 1a and the overhead image generated from the camera image taken with the image taking device 1a by the processing at step ST106, and thereby obtains the subject region within the overhead image. FIG. 5(b) shows a subject region 41a of the subject 3 specified within the overhead image 4a corresponding to the image taking device 1a.

Then the subject detecting unit 107 determines the position in the subject region 41a closest to the position of the image taking device 1a as the subject position 44. Alternatively, the subject detecting unit 107 may divide the subject region 41 into a plurality of portions, and determine the portion closest to the image taking device 1a among the plurality of portions as the subject position 44.

The projection plane defined by the projection plane calculating unit 108 at the subject position 44 is a flat projection plane that stands facing the image taking device 1a.

In the above description, a case in which the processing is executed on the basis of a pixel data unit constituting the camera image is shown. However, each step of processing described above can be executed on the image to which an image processing or the like is applied so that the number of pixels of the image becomes different from the original number of pixels of the image taking device.

As described above, according to the image processing device 100 of this embodiment 1, it is possible to obtain the image by synthesizing the subject image, which is generated by projecting the camera images onto the projection planes newly defined at the subject position, with overhead image(s). Thus, it is possible to generate subject image(s) in which distortion is suppressed individually in the overhead image.

In addition, in the image processing device 100 that detects the subject as described above, it is not necessary to prepare a sensor such as an ultrasonic sensor for detecting a subject, thereby being able to simplify the configuration.

However, if there are no restrictions on the sensor installation, it is also possible to install a sensor for detecting a subject to detect the subject position. In this case, it is also possible to achieve the above advantage of being able to generate the subject images whose distortions are suppressed individually in the overhead image.

For example, an infrared camera is provided, and the position of the subject is detected by the subject detecting unit 107 using the camera image taken with the infrared camera. At this time, the processing other than calculating the difference can be used appropriately in each step of processing of the subject detecting unit 107 shown by the foregoing step ST108, etc.

In this way, as for a method of detecting the subject position, a variety of methods are conceivable, and well-known techniques other than the techniques described above can also be used appropriately to detect the subject position.

In addition, the subject detecting unit 107 is designed to calculate, for each image taking device, the difference between the overhead image generated from the camera image and the overhead image generated from the image for difference calculation, and to determine the portion in which the subject regions are superimposed with each other as the detected position of the subject. Thus, the subject detecting unit 107 can calculate the appropriate subject position in the superimposed region of the overhead image generated by the overhead image generating unit 105.

In addition, the projection plane calculating unit 108 is designed to calculate the projection plane on the basis of the viewpoint position of the overhead images. Using such a projection plane makes it possible to efficiently generate the subject image in which a subject is appropriately displayed.

Embodiment 2

In the embodiment 1, when a cycle of the processing from step ST105 to step ST111 is completed, and subsequently next cycle of the processing from step ST105 to step ST111 is executed, an identical viewpoint position is used for generating the overhead image. In other words, while the image processing device 100 executes the image processing, the viewpoint position of the overhead image is fixed. In the embodiment 2, an image processing device 200 which can change the viewpoint position of the overhead images will be described.

Figure 6:
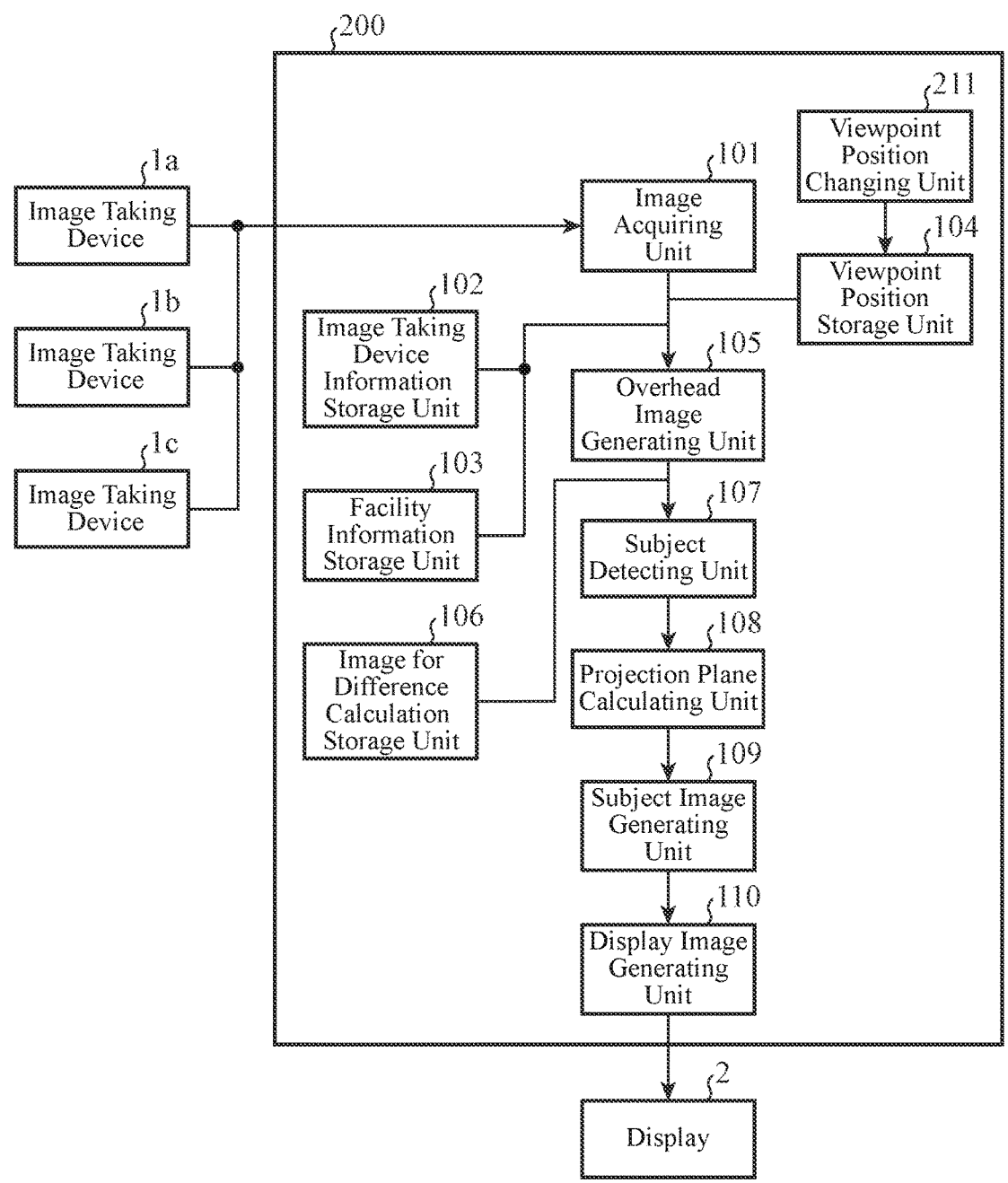
FIG. 6 is a block diagram showing a configuration of an image processing device according to an embodiment 2 of the present invention.

FIG. 6 shows a configuration of the image processing device 200. The image processing device 200 includes a viewpoint position changing unit 211 in addition to the image acquiring unit 101, image taking device information storage unit 102, facility information storage unit 103, viewpoint position storage unit 104, overhead image generating unit 105, image for difference calculation storage unit 106, subject detecting unit 107, projection plane calculating unit 108, subject image generating unit 109, and display image generating unit 110.

The viewpoint position changing unit 211 receives a user operation via an input device not shown in the drawings to change the viewpoint position stored in the viewpoint position storage unit 104 to the position the user desires. At this occasion, the viewpoint position changing unit 211 presents a plurality of candidates of the viewpoint position, for example, and enables the user to select one of the candidates. Alternatively, the viewpoint position changing unit 211 does not present the candidates, but enables the user to designate any desired viewpoint position.

The viewpoint position changing unit 211 is formed by a semiconductor integrated circuit in which a CPU is implemented, for example. In addition, when the image processing device 200 is formed by a computer, a program describing the processing details of the viewpoint position changing unit 211 is stored in the memory of the computer.

As for the components other than the viewpoint position changing unit 211, the same or corresponding components to those of FIG. 1 are designated by the same reference numerals, and their description will be omitted or simplified.

An example of the processing by the image processing device 200 will be described with reference to the flowchart shown in FIG. 7.

As for steps ST101 to ST104, the processing is the same as the processing described in the embodiment 1.

Subsequent to step ST104, the viewpoint position changing unit 211 overwrites the viewpoint position selected or designated by a user and stores it in the viewpoint position storage unit 104 (step ST212). At this time, the processing from step ST212 onward is executed by using the viewpoint position stored in the viewpoint position storage unit 104.

As for the processing at steps ST105 to ST111 subsequent to step ST212, the same processing as the embodiment 1 is performed.

Figure 7:
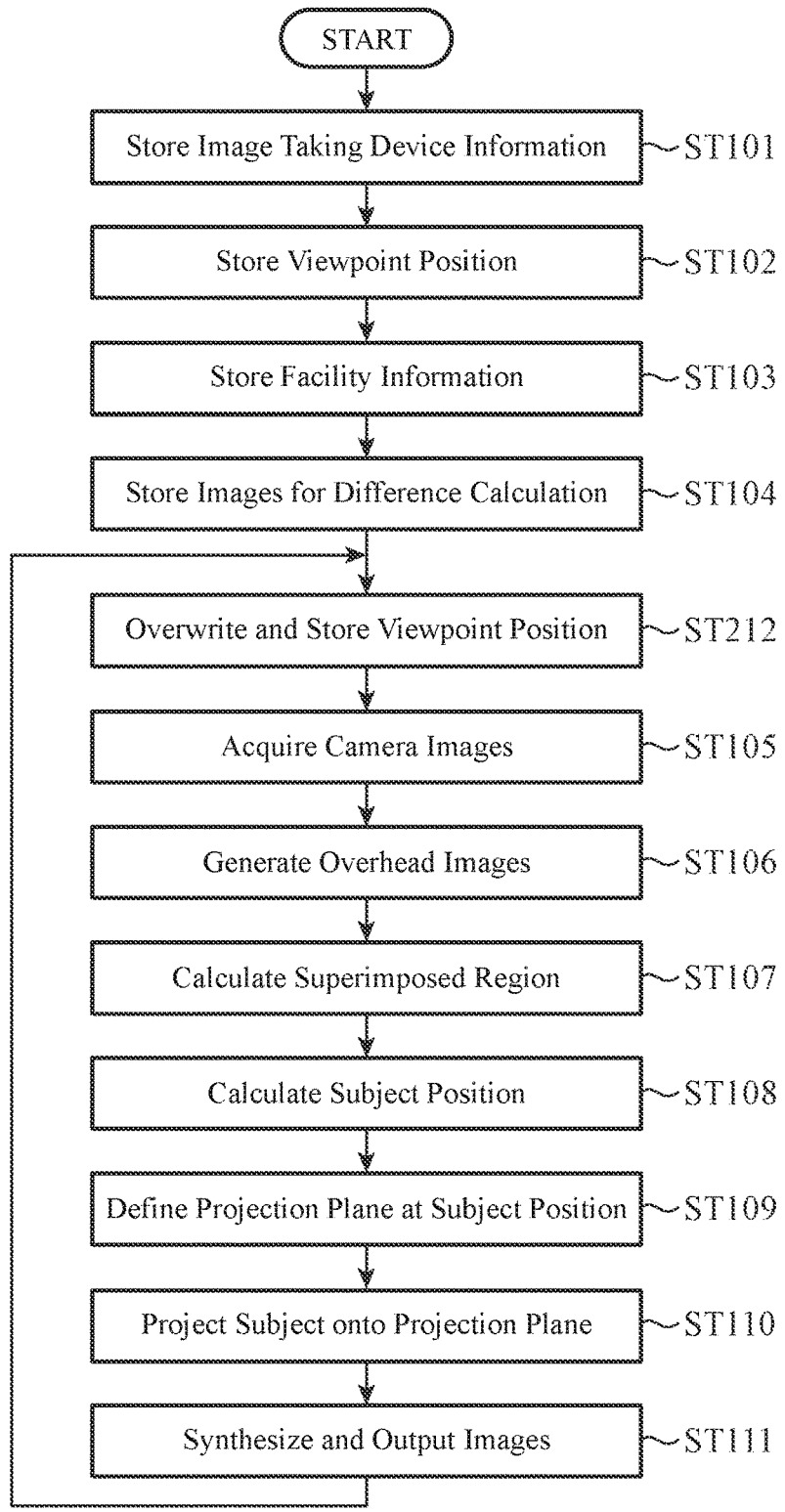
FIG. 7 is a flowchart showing the processing of the image processing device according to the embodiment 2 of the present invention.

As shown in FIG. 7, in the image processing device 200, at a time after a one cycle from step ST105 to step ST111 is completed, and before proceeding to the processing of the next cycle from step ST105 to step ST111, the viewpoint position changing unit 211 changes the viewpoint position. Thus, the viewpoint position the user desires, which is input at any timing during a cycle from step ST105 to step ST111, is used in the processing of the next cycle. Of course, unless the user operation for changing the viewpoint position is carried out, the same viewpoint position is used in the processing in the next cycle. In this way, in this embodiment 2, it is possible to generate the overhead images from a different viewpoint position for each cycle.

When proceeding to step ST212 for the first time after completing steps ST101 to ST104, that is, in the case of the first processing cycle, unless the user operation for changing the viewpoint position is carried out up to that time, the processing at step ST212 is substantially skipped to proceed to step ST105.

As described above, according to the image processing device 200 of the embodiment 2, since the viewpoint position changing unit 211 is provided, in addition to the advantages shown in the embodiment 1, the advantage of being able to execute the processing by reflecting the viewpoint position a user desires at any time as required is achieved.

Note that, it is to be understood that any combination of the individual embodiments, variations of any components of the individual embodiments or removal of any components of the individual embodiments is possible within the scope of the present invention.

INDUSTRIAL APPLICABILITY

As described above, an image processing device and an image processing method according to the present invention can generate a subject image whose distortion is suppressed individually in an overhead image. Accordingly, the image processing device and the image processing method are suitably used by incorporating them, for example, into a monitoring system that includes an image taking device and a display for monitoring facilities.

REFERENCE SIGNS LIST

1*a* to 1*c*: image taking device, 2: display, 3: subject (object), 4*a*, 4*b*: overhead image, 5: projection plane, 41*a*, 41*b*: subject region (object region), 42: superimposed region, 43, 44: subject position (object position), 51: projection plane, 100: image processing device, 101: image acquiring unit, 102: image taking device information storage unit, 103: facility information storage unit, 104: viewpoint position storage unit, 105: overhead image generating unit, 106: image for difference calculation storage unit, 107: subject detecting unit (object detecting unit), 108: projection plane calculating unit, 109: subject image generating unit (object image generating unit), 110: display image generating unit, 200: image processing device, 211: viewpoint position changing unit

The invention claimed is:

1. An image processing device comprising:
an image acquirer acquiring an image taken with at least one image taking device;
a processor configured to perform the functions of:
an overhead image generator calculating on a basis of image taking device information regarding the at least one image taking device and space information regarding a space whose image is taken with the at least one image taking device, correspondence between pixel data constituting the image and the space, and generating overhead image from the image based on the correspondence;
an object detector detecting a position of an object on which corresponding information does not exist in the space information;
a projection plane calculator calculating a projection plane at the position of the object;
an object image generator generating an object image of the object looked at from a viewpoint position of the overhead image by setting the image onto the projection plane;
a display image generator generating an image by synthesizing the object image with the overhead image; and
an overhead image for difference calculation generator generating overhead images for difference calculation from images for difference calculation by calculating correspondence between pixel data constituting the images for difference calculation taken with a plurality of image taking devices included in the at least one image taking device and taking a plurality of images respectively and the space on the basis of the image taking device information and the space information, wherein
the overhead image generator generates the overhead images from the images taken with the plurality of the image taking devices, respectively;
the overhead image for difference calculation generator generates the overhead images for difference calculation from the images for difference calculation taken with the plurality of image taking devices; and
the object detector obtains an object region from a difference between the overhead image and the overhead image for difference calculation for each of the at least one image taking device, and detects a superimposed portion of the object regions as the position of the object.

2. The image processing device according to claim 1, wherein
the projection plane calculator calculates the projection plane on the basis of the viewpoint position of the overhead image.

3. An image processing method comprising:
acquiring an image taken with at least one image taking device;
calculating on a basis of image taking device information regarding the at least one image taking device and space information regarding a space whose image is taken with the at least one image taking device, correspondence between pixel data constituting the image and the space, and generating overhead images from the image based on the correspondence;
detecting a position of an object which does not have the space information corresponding to the object;
calculating a projection plane at the position of the object;
setting the image onto the projection plane, and generating an object image of the object looked at from a viewpoint position of the overhead image; and
generating an image by synthesizing the object image with the overhead image; and generating overhead images for difference calculation from images for difference calculation by calculating correspondence between pixel data constituting the images for difference calculation taken with a plurality of image taking devices included in the at least one image taking device and taking a plurality of images respectively and the space on the basis of the image taking device information and the space information, wherein in the generating overhead images from the image based on the correspondence, the overhead images are generated from the images taken with the plurality of the image taking devices, respectively;

in the generating overhead images for difference calculation, the overhead images for difference calculation are generated from the images for difference calculation taken with the plurality of image taking devices; and in the detecting, an object region is obtained from a difference between the overhead image and the overhead image for difference calculation for each of the at least one image taking device, and a superimposed portion of the object regions is detected as the position of the object.

* * * * *